Figure 1:
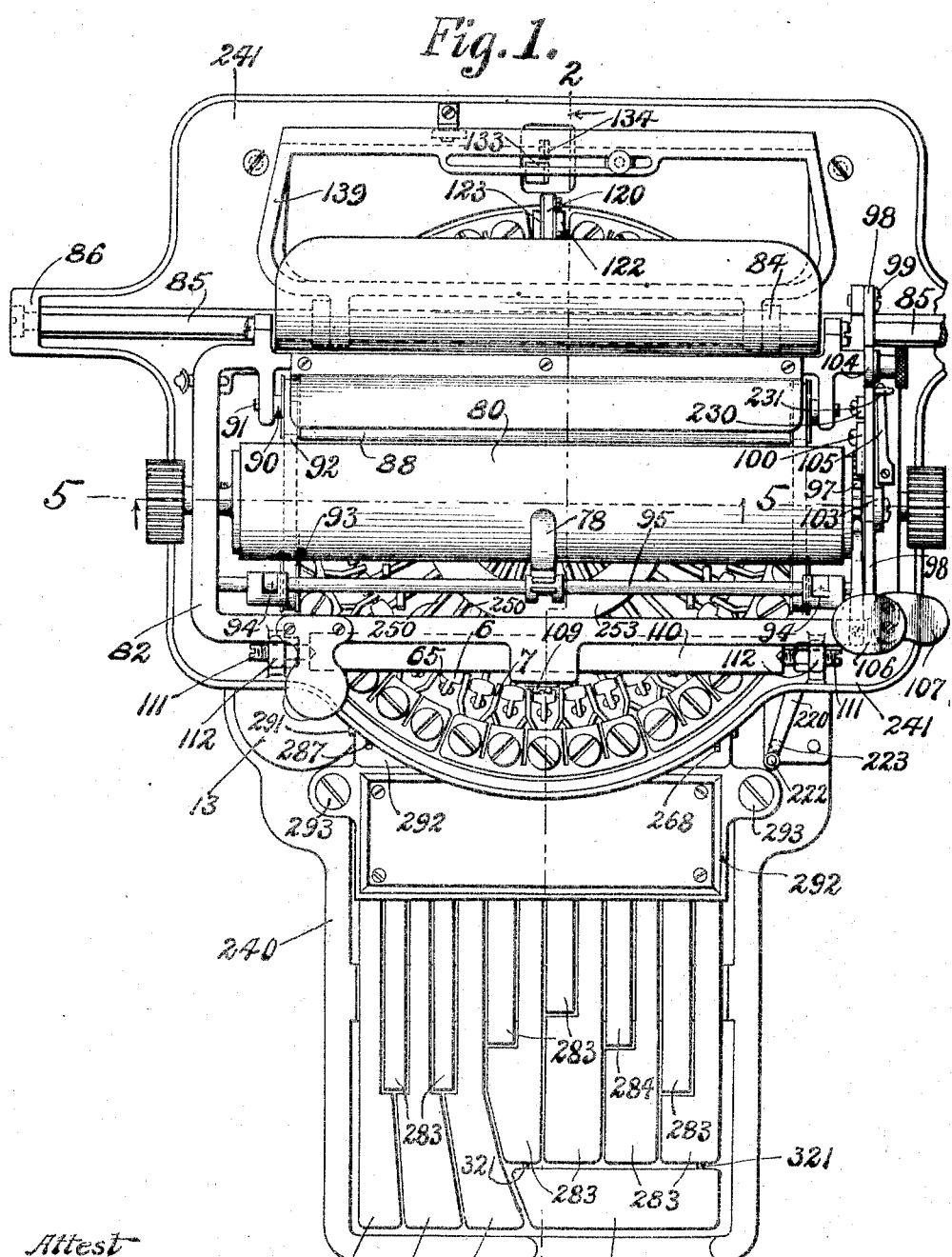

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 2.

Attest,
A. M. Poynton
Arthur T. Cahill

Inventor
Thaddeus Cahill

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 3.

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 4.

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 5.

Attest
A. R. Poynton.
Arthur T. Cahill,

Inventor
Thaddeus Cahill

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 6.

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 7.

Attest,
A. M. Poynton.
Arthur T. Cahill.

Inventor,
Thaddeus Cahill.

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL. 10 SHEETS—SHEET 8.
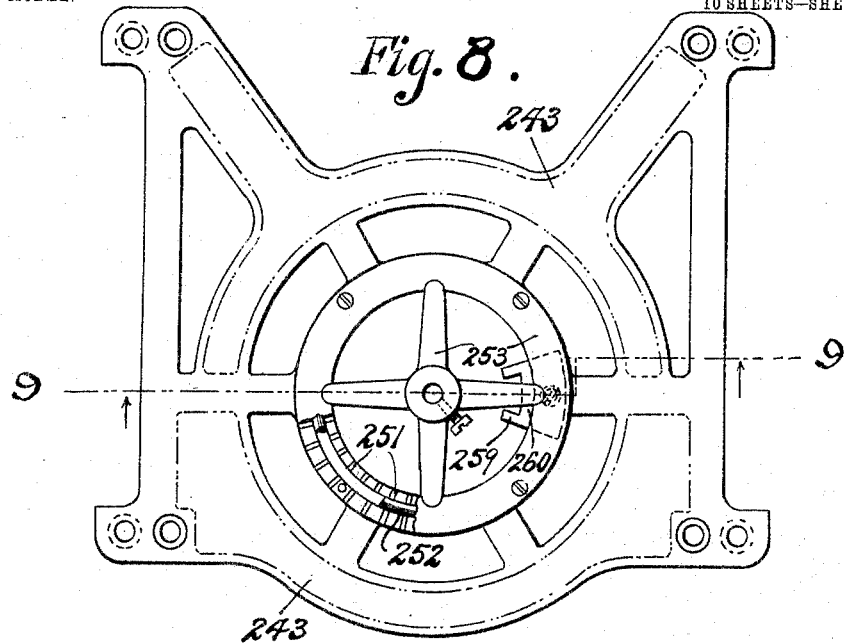
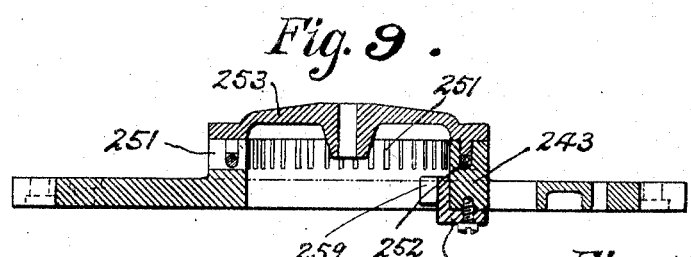
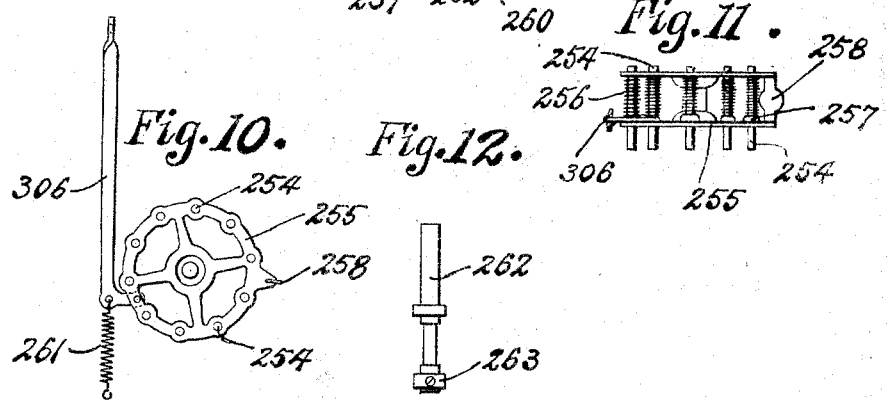

No. 777,652. PATENTED DEC. 13, 1904.
T. CAHILL.
TYPE WRITING MACHINE OR OTHER SIMILAR INSTRUMENT.
APPLICATION FILED FEB. 28, 1901.
NO MODEL.
10 SHEETS—SHEET 9.
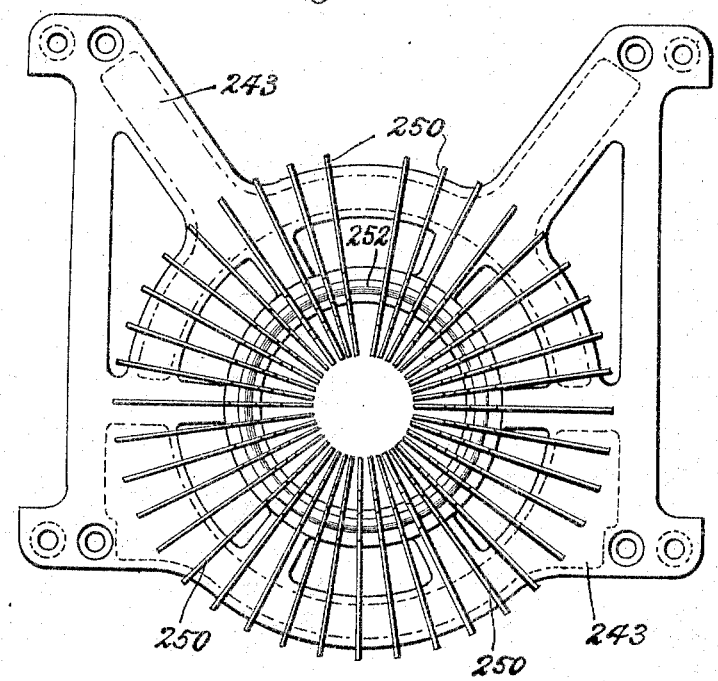
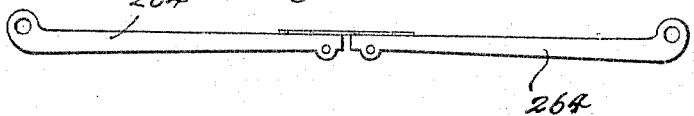

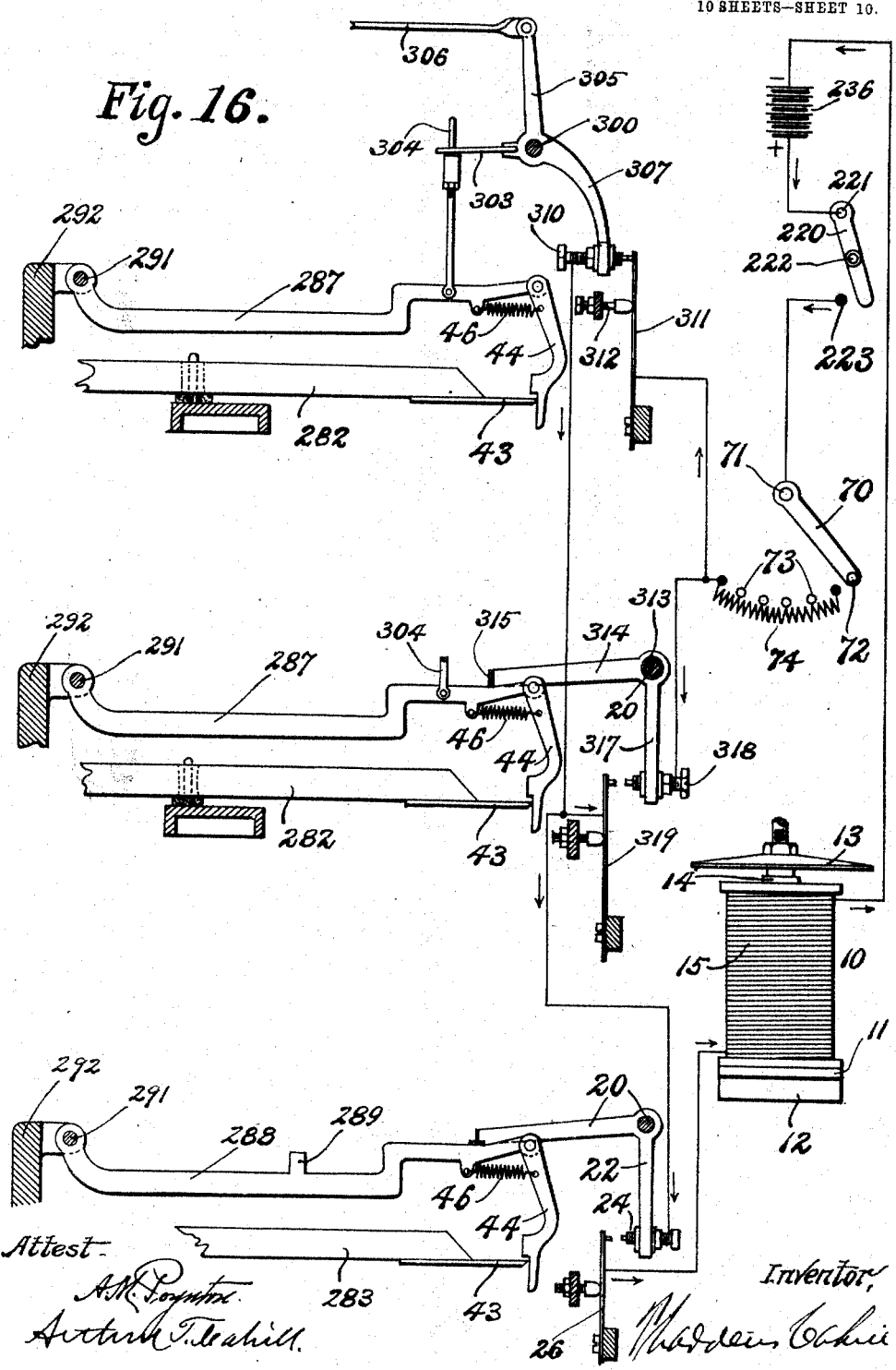

No. 777,652.

Patented December 13, 1904.

UNITED STATES PATENT OFFICE.

THADDEUS CAHILL, OF NEW YORK, N. Y.

TYPE-WRITING MACHINE OR OTHER SIMILAR INSTRUMENT.

SPECIFICATION forming part of Letters Patent No. 777,652, dated December 13, 1904.

Application filed February 28, 1901. Serial No. 49,266. (No model.)

*To all whom it may concern:*

Be it known that I, THADDEUS CAHILL, a citizen of the United States, and a resident of the city, county, and State of New York, (temporarily residing at Washington, in the District of Columbia,) have invented certain new and useful Improvements in Type-Writing Machines or other Similar Instruments, of which the following is a specification.

The object of my invention is to make an improved type-writing machine; and my invention consists in the parts, improvements, and combinations hereinafter described, and specifically set forth in the statement of claims at the end hereof.

The mechanism illustrated in the accompanying drawings resembles in many particulars that illustrated in Letters Patent of the United States to me, No. 657,478, dated September 4, 1900; but there are substantial improvements in detail embodied in the structure illustrated by the accompanying drawings and which are specifically set forth in the statement of claims at the end hereof. To render the whole more clear, however, I shall describe the machine illustrated in the drawings in its more essential features, after which in the statement of claims at the end hereof that which is new is clearly pointed out.

Figure 2:
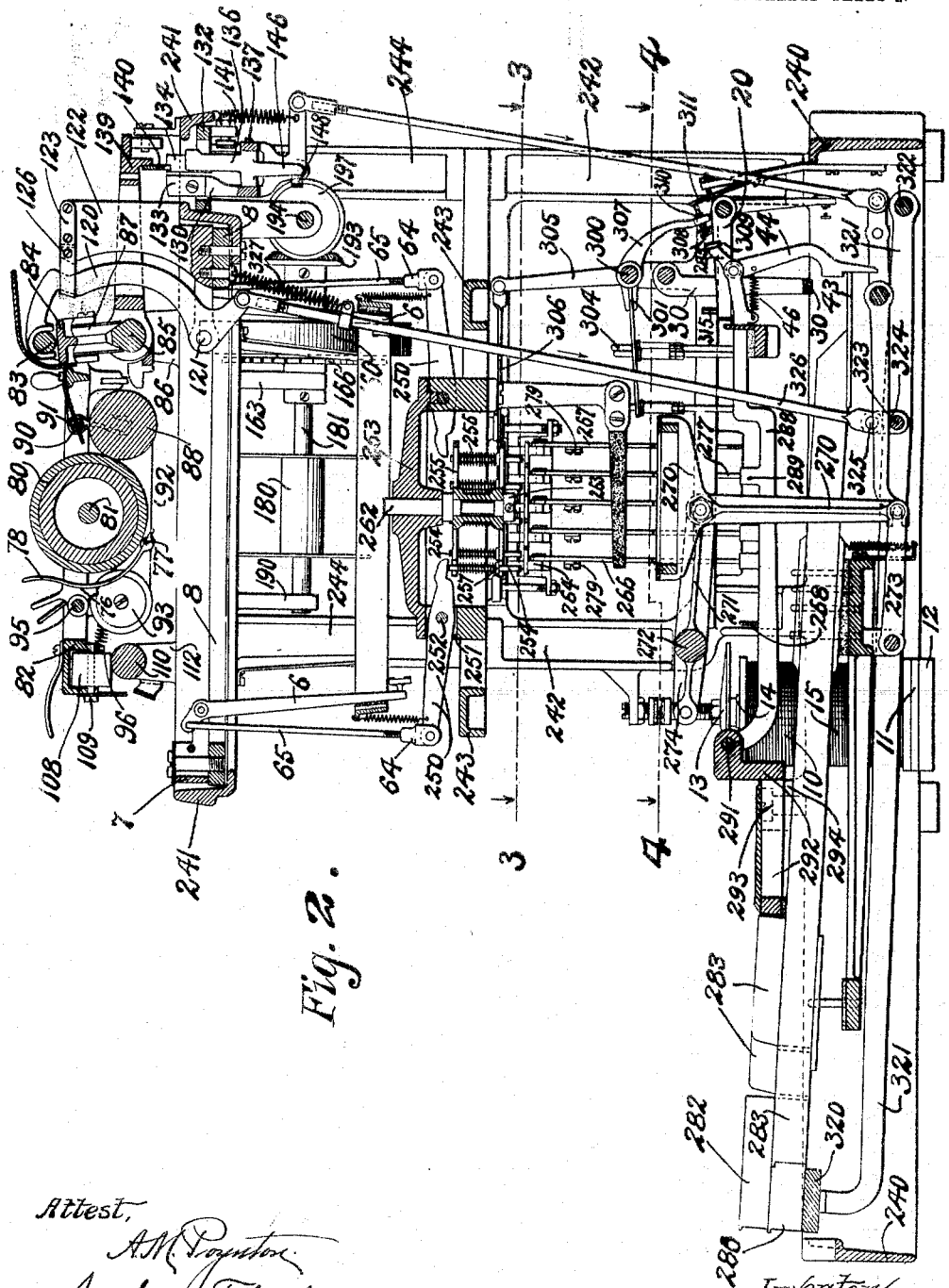
Figure 3:
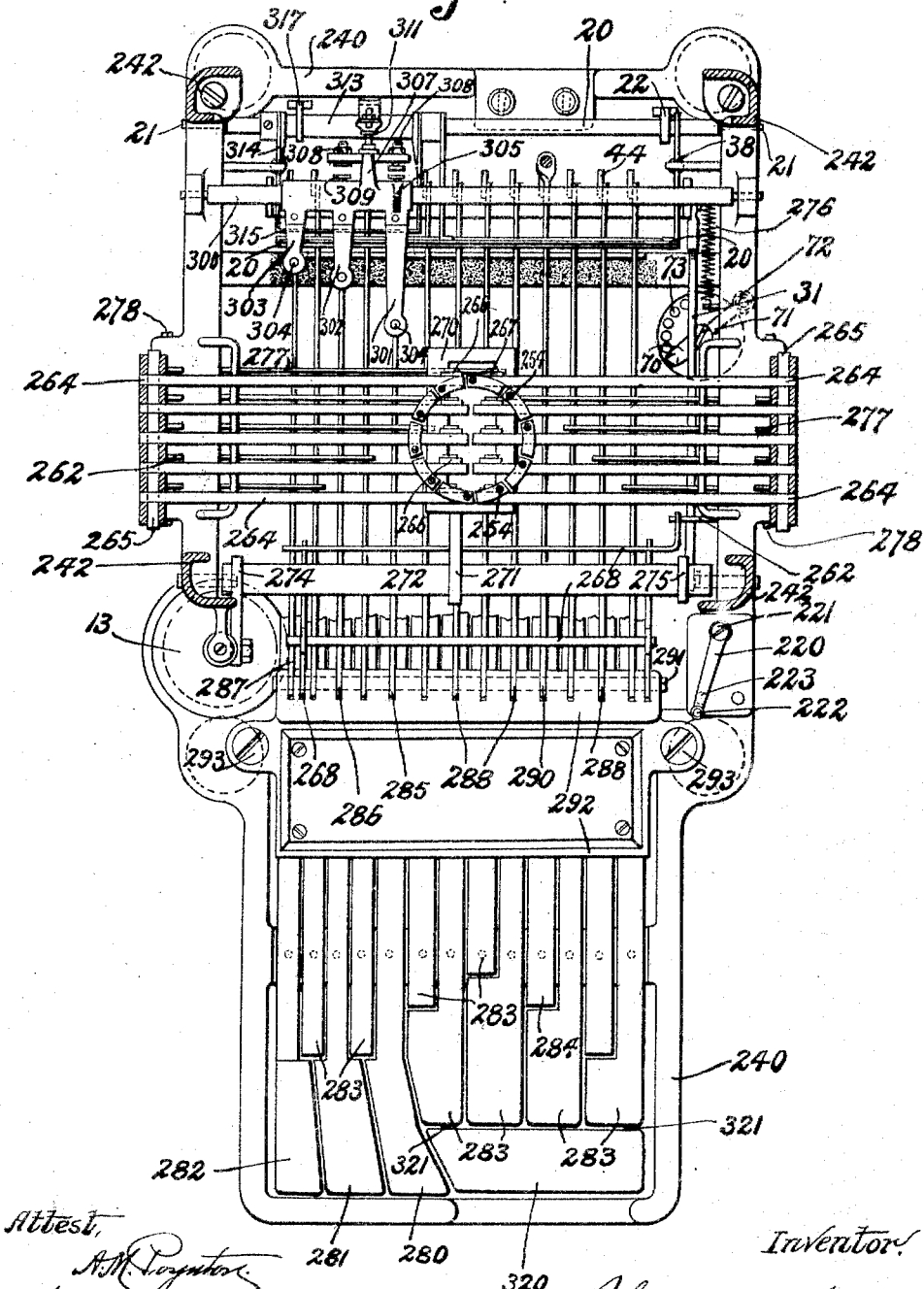
Figure 4:
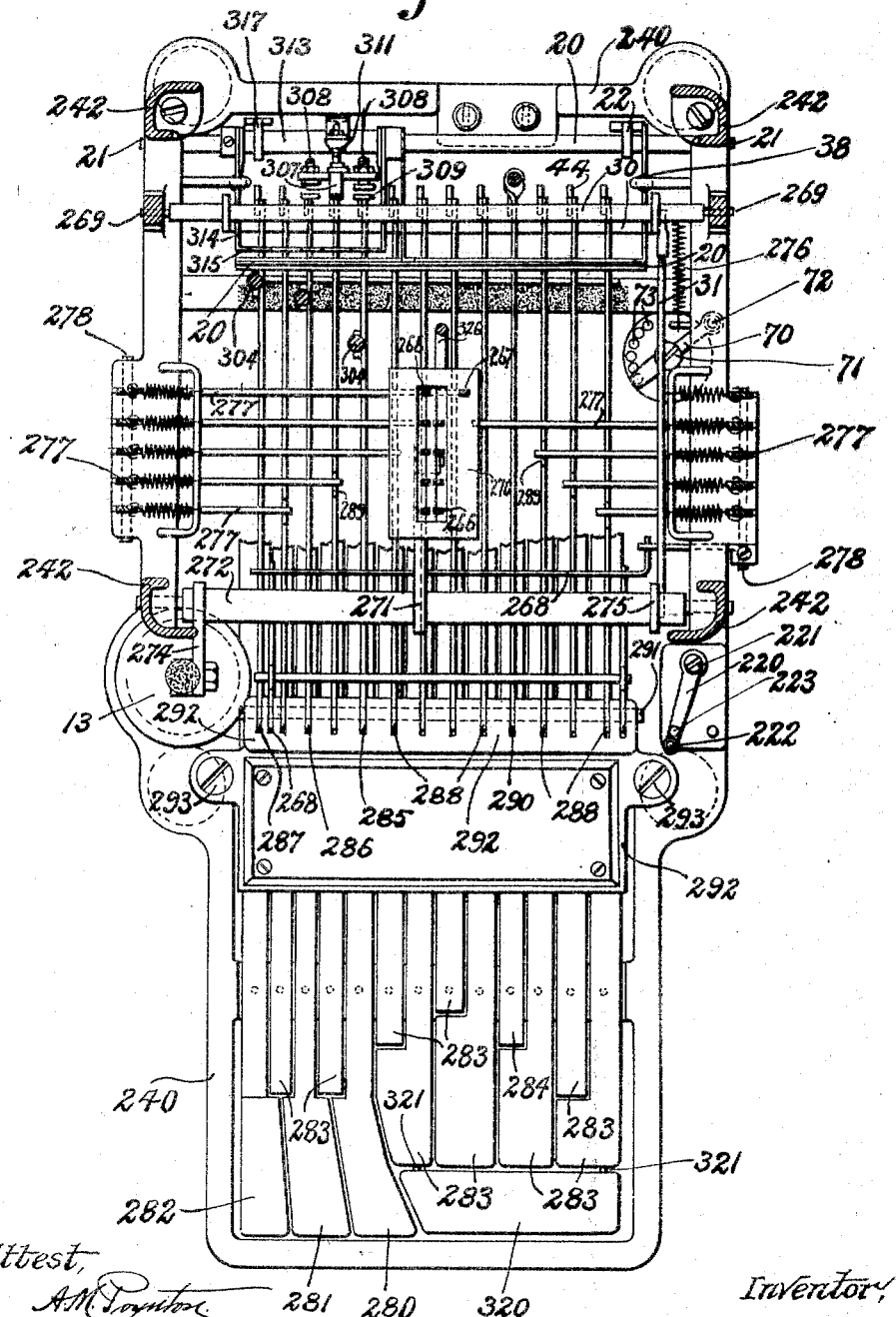
Figure 5:
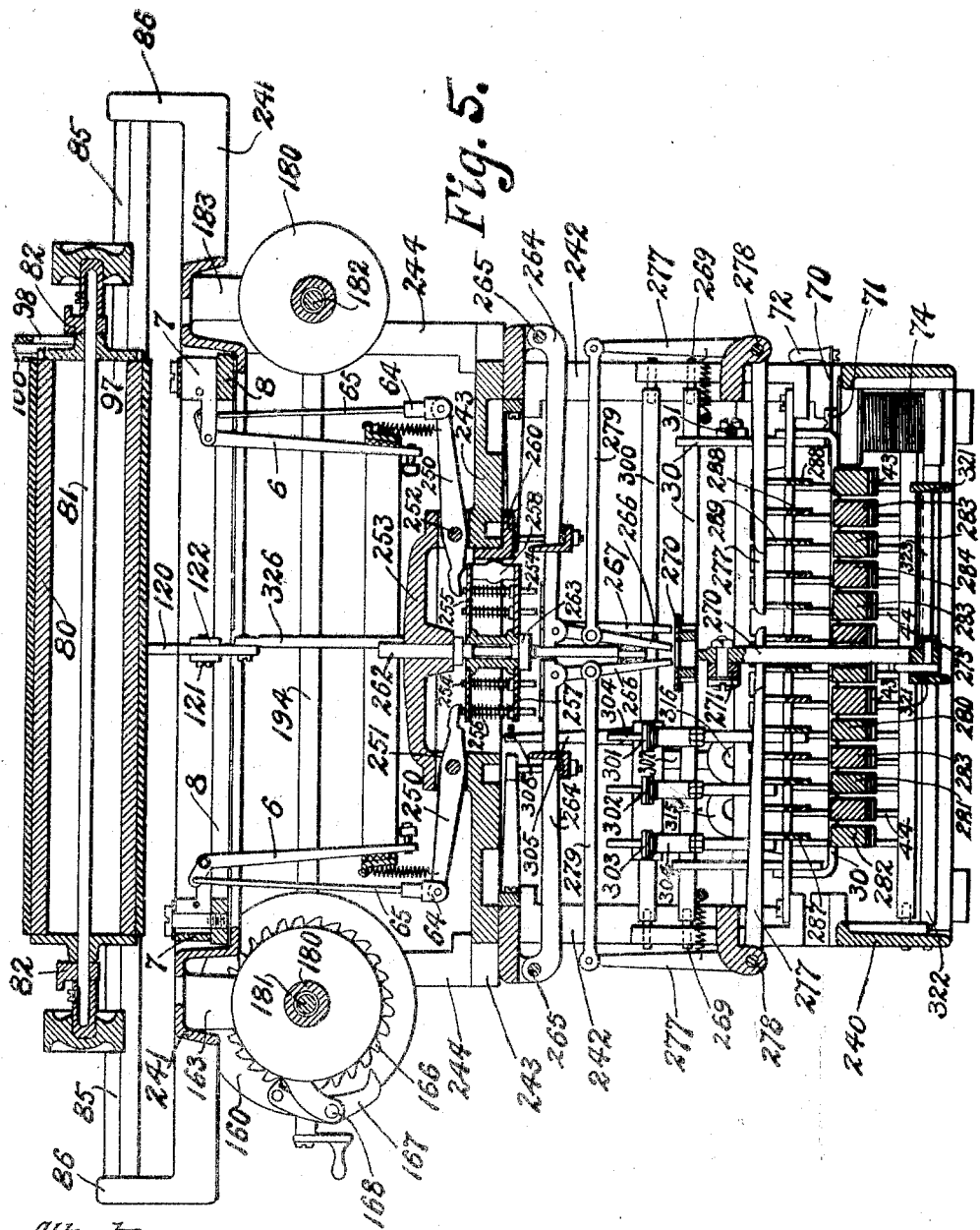
Figure 6:
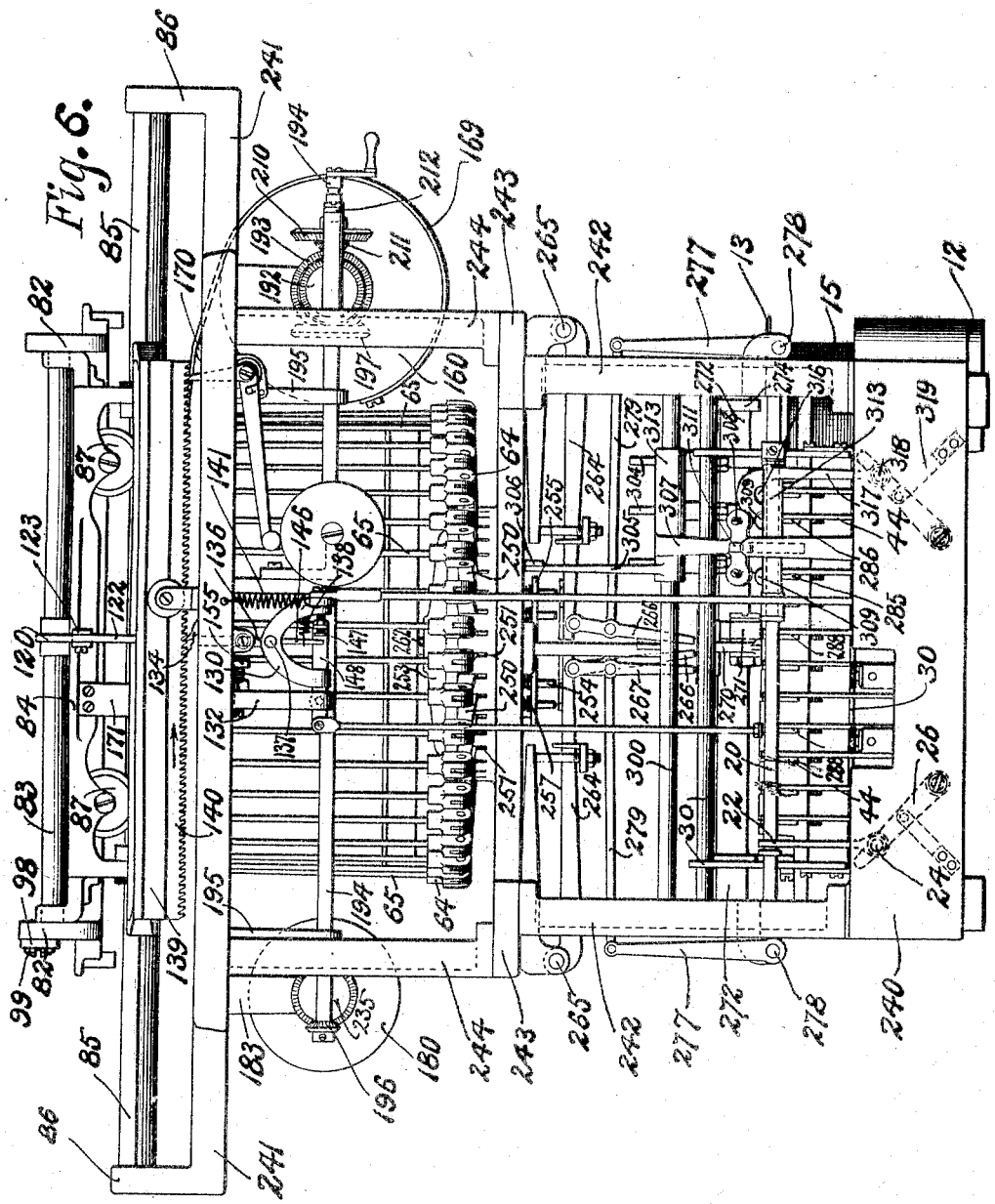
Figure 7:
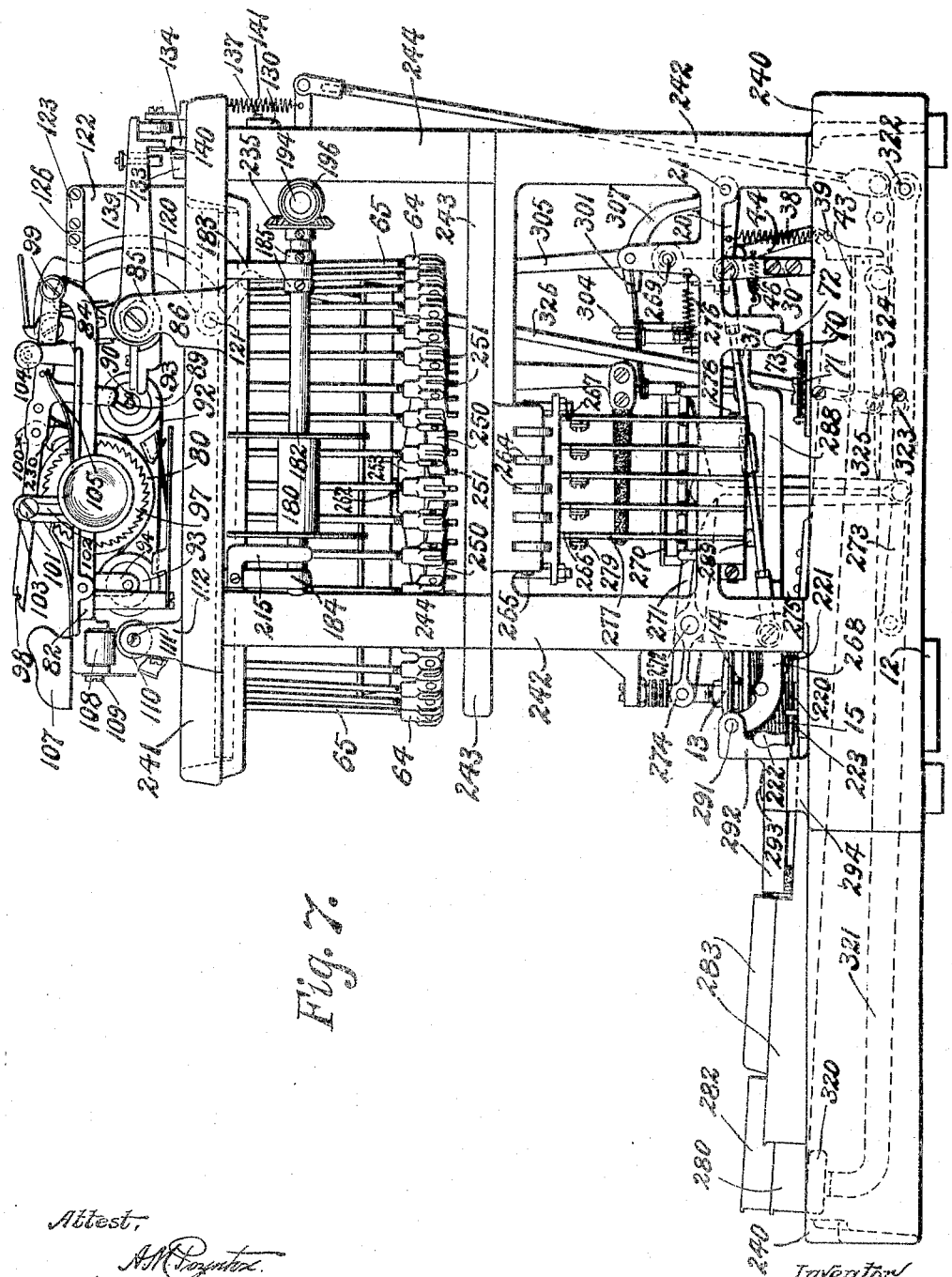

In the accompanying drawings, Figure 1 is a plan view of the machine. Fig. 2 is a longitudinal vertical section on the line 2 2, Fig. 1. Fig. 3 is a horizontal section on the line 3 3, Fig. 2. Fig. 4 is a horizontal section on the line 4 4 of Fig. 2. Fig. 5 is a transverse section on the line 5 5 of Fig. 1. Fig. 6 is a rear elevation. Fig. 7 is a side elevation. Fig. 8 is a detail plan view of the center ring or fulcrum-ring with the cap-ring in place, a portion of said cap-ring being broken away to show the milled slots in fulcrum-ring and the annular wire upon which the radial levers are fulcrumed. Fig. 9 is a sectional view on the line 9 9, Fig. 8. Fig. 10 is a plan view of the pin-carrier with its link and returning spring. Fig. 11 is an elevation of the same. Fig. 12 is an elevation of the pin-carrier axle. Fig. 13 is a plan view of the fulcrum-ring, showing the radial levers in position, the cap-ring being removed. Fig. 14 is a plan view of the group-controlling levers. Fig. 15 is a detail side elevation of the same, and Fig. 16 is a diagrammatic view illustrating the arrangement of the electric circuit.

Similar reference-numerals refer to similar parts in all the drawings.

*Of the main frame.*—The main frame consists, essentially, of (*a*) a bed-plate 240, (*b*) a top plate 241, (*c*) a center ring or fulcrum-ring 243, (*d*) side standards 242 242, bolted to the bed-plate and serving to support the fulcrum-ring 243, the group-controlling levers, the bell-crank levers, the motor-frame, the circuit-closing frame, the releasing-frame, the pin-carrier-driving frame, and various other parts hereinafter described, and (*e*) four columns 244 244 244 244, that rise from the fulcrum-ring 243 to support the top plate 241.

*Of the type-bars and the means for controlling them.*—6 6, Figs. 2 and 5, are the type-bars, fulcrumed by means of hangers 7 7, screwed fast to the hanger-ring 8.

250 250 are the radial levers, which are set in milled slots 251 251 in the fulcrum-ring 243 and are fulcrumed by means of a circular or segmental wire 252, held in place by means of a cap-ring 253, which has slots milled in it to correspond with the slots in the fulcrum-ring 243, to which it is attached by suitable screws. Each of the radial levers 250 250 corresponds to one of the type-bars 6 6 and is connected with the short arm of such type-bar by means of a connecting-nut 64 and link 65.

Underneath the inner ends of the radial levers 250 250 are the pins 254 254, (one pin to every four radial levers as the machine illustrated in the drawings is constructed, though the number of radial levers in a group and controlled by a single pin may of course be altered, if desired,) mounted in the oscillating pin-carrier 255 and held in their normal positions (shown in Figs. 2, 5, and 11) by light expansive springs 256 256, which bear upon collars 257 257, attached to the pins 254 254, pressing said collars down on the lower disk of the pin-carrier 255. Each of the pins 254 254 serves to give movement to the different radial levers of the group controlled by it, to each radial lever as required, the pin-carrier 255 being oscillated to bring its pins into operative relation with the different radial levers which it controls, each as required.

Just below the pins 254 254 are the group-controlling levers 264 264, which are centered on the rods 265 265. Said rods are supported by the standards 242 242, said standards being milled to produce slots to receive the several group-controlling levers aforesaid. The proximate ends of the group-controlling levers 264 264 are made segmental, as illustrated in Figs. 3 and 14, so that however the pin-carrier may be oscillated or vibrated within the limits of its movement each of the pins 254 254 always lies over the corresponding group-controlling lever 264.

Movement-receiving arms 266 266 are pivoted to the group-controlling levers 264 264. An oscillating frame 270 underlies the said movement-receiving arms. Said frame is mounted by means of the arm 271 of the rock-shaft 272 and the bridle-lever 273, to both of which it is pin-jointed. To the other arm, 274, of the rock-shaft 272 the armature 13 is connected. Said armature 13 and the core 11 (which is attached to the soft-iron plate 12, which is bolted to the bottom of the bed-plate 240) lie within a non-ferruginous tube 14, upon which the energizing-coil 15 is wound. The magnet thus formed serves when energized to give movement to the oscillating frame 270 aforesaid, and thereby to whatever one of the group-controlling levers 264 264 that may have its movement-receiving arm 266 266 overlying said frame. A movement-receiving arm 267, hinged to one of the group-controlling levers 264, normally overlies the motor-frame 270, while all the other movement-receiving arms 266 266 lie normally out of the path of movement of said frame.

We have seen that each of the group-controlling levers 264 264, with the corresponding pin 254, controls a different group of the radial levers 250 and the type-bars 6 6. The question, then, of what type-bar shall be impelled when the oscillating frame 270 strikes up depends upon (a) what one of the group-controlling levers 264 264 has its movement-receiving arm in the path of movement of the motor-frame 270 and (b) what position the oscillating pin-carrier 255 occupies, whether its normal position or some one of the positions into which it is moved, respectively, by the depressing of the keys 280 281 282.

To control the nine movement-receiving arms 266 266 and the group-controlling levers 264 264, with which they are connected, there are nine keys 283 283, each of which serves, as we shall soon see, when depressed to swing the movement-receiving arm 266, connected with the group-controlling lever 264 that corresponds to such key, over the reciprocating frame 270 to receive movement therefrom, and the three keys 280 281 282 serve to oscillate or vibrate the pin-carrier 255 into the different positions required to connect each of the group-controlling levers 264 264 aforesaid with the different radial levers 250 250 of the group to which it corresponds.

*Of the keyboard.*—Let us now consider the arrangement of the keys and the parts which they actuate. As to the arrangement of the keys, (see particulary Fig. 1,) the keys 280 281 282, controlling the pin-carrier 255, are designed to be operated ordinarily and properly by the thumb, while the nine keys 283 283, corresponding to and controlling the different group-controlling levers 264 264, are designed to be regularly and properly operated by the fingers, excluding the thumb. The space-key 284 is designed to be operated by the ring-finger, which also operates one of the keys 283.

Overlying the keys 280 281 282 283 283 283 and the space-key 284 is a set of key-corresponding key-actuated levers (which for greater convenience and to distinguish them from the key-levers we shall sometimes hereinafter term "key-actuated" levers or "key-corresponding" levers) 285, 286, and 287, 288 288 288, and 290. These levers are fulcrumed in front by means of the rod 291, which is set in the support 292 292. Said support or arm is milled to receive the key-actuated levers aforesaid and also to receive the normal frame 268. It serves also as a stop to limit the upward movement of the keys, and it is attached by screws 293 293 to lugs 294 294, that rise from the bed-plate. To the rear end of each of the key-actuated levers 285, 286, 287, 288 288 288, and 290 is hinged a releasing arm or latch 44, which is held by a contractile spring 46, normally in contact with a steel extension 43, attached to the rear end of the corresponding key-lever. (See Fig. 2.) The latches 44 aforesaid serve each to connect the key-actuated lever to which it is pivoted to the corresponding key-lever, (280, 281, 282, 283, or 284,) so that when said key-lever is depressed in front by the operator it rises back of the fulcrum and lifts the corresponding key-actuated lever through the latch 44; but as the type-bar moves under the influence of the motor-magnet 10 aforesaid toward the printing-point the releasing-frame 30 (which is centered at 269 and connected by a link 31 with the arm 275 of the rock-shaft 272, Figs. 4, 5, and 7) strikes the latch 44, moving it off the extension 43, connected with the corresponding key-lever and allowing all the parts to return to their normal positions immediately and before the operator has released the key-lever.

Bell-cranks 277 277, fulcrumed by means of the rods 278 278 and set in milled slots in the standards 242 242 and having their horizontal arms overlying the key-actuated levers 288 288 288 (each of which is furnished with a projection 289, rising above it to act upon the corresponding bell-crank 277) and having their vertical arms connected by links 279 279 with the movement-receiving arms 266 266, serve to connect the key-actuated levers 288 288 288 with the movement-receiving arms 266 266, pivoted to the corresponding group-controlling levers 264 264, so that each of the keys 283 283 when depressed lifts, through the latch 44, the corresponding key-actuated lever 288, which serves (a) to swing, through its bell-crank 277 and link 279, the movement-receiving arm 266, connected with the corresponding group-controlling lever 264, over the oscillating motor-frame 270 to receive movement therefrom; (b) to lift the normal frame 268,—which is centered upon the same rod 291 which serves as a fulcrum for the levers 285, 286, 287, 288 288 288, and 290 and which acts on one of the bell-cranks 277 aforesaid and through said bell-crank and the link 279, connected therewith, swings the normal movement-receiving arm 267 off from over the motor-frame 270, and (c) to lift the circuit-closing frame 20, centered at 21, and having an arm 22, carrying the battery-connected screw 24, furnished with a platinum point to make contact with a similar platinum point in the spring 26, (see Figs. 6 and 16,) thereby closing the circuit through the electromagnet before described, so that the core 11, becoming magnetized, attracts the armature 13, which thereupon lifts the motor-frame 270, thereby giving movement to whatever one of the movement-receiving arms 266 266 overlies it and to the group-controlling lever 264, to which said movement-receiving arm is pivoted, and to the pin 254 overlying said group-controlling lever. Said pin in turn gives movement to whatever one of the radial levers 250 250 it underlies, and the radial lever thus moved gives movement through the link 65 to the corresponding type-bar 6, throwing the type carried thereby toward the printing-center, so that it prints. As the type-bar approaches the printing-point the releasing-frame 30 (centered at 269 and connected by a link 31 with the arm 275 of the magnet-actuated rock-shaft 272) strikes the latch 44, moving it off of the end piece 43, attached to the corresponding key-lever, and thereupon the key-actuated lever returns to its normal position, releasing the various parts controlled by it and among others releasing the circuit-closing frame 20, which returning to its normal position breaks the circuit of the magnet aforesaid, whereupon the armature 13, with the oscillating frame 270, return to their normal positions under the influence of the contractile spring 276, releasing the movement-receiving arm 266, group-controlling lever 264, pin 254, radial lever 250, and type-bar 6, all of which immediately return to their normal positions, being assisted thereto by suitable springs, some of which are omitted from the drawings. The return of all the parts to their normal positions takes place in a very small depress another key or keys to print another letter without having to wait to release the key or keys first depressed.

Each of the key-levers 283 283 283 (which from the fact that they are designed to be normally and regularly operated by the fingers of the hand as distinguished from the thumb we may properly term "finger-keys" or "finger-key levers") serves when depressed to cause some one of the type-bars of the group corresponding to it to be actuated by the motor-frame 270, and if no one of the keys 280 281 282 (which from the fact that they are designed to be normally and regularly operated by the thumb we may call "thumb-keys" or "thumb-key levers") is at the same time depressed that one of the type-bars of the group is actuated whose radial lever 250 overlies the corresponding pin 254 when the pin-carrier 255 is in its normal position, with the stop 258, attached to it, held in contact with the stop 259 of the support 260 by the contractile spring 261. The keys 280, 281, and 282 serve to oscillate the pin-carrier 255, and thereby to control what one of the type-bars of a group shall be actuated. For this purpose a pin-carrier-driving frame is used, consisting of (a) a rock-shaft 300, (b) three driving-arms 301 302 303, upon which the keys 280 281 282, respectively, act through the latches 44 44 44, levers 285, 286, and 287, and push-pieces 304 304, (c) a connecting-arm 305, connected by the link 306 with the pin-carrier 255, and (d) a stop-arm 307, carrying screws 308 308, (adjustable by means of lock-nuts,) which strike the stops 309 309, Figs. 2, 3, and 6, attached to the rear ends of the key-actuated levers 285 286. Each of the pins 254 254, it will be observed, controls a group of four of the radial levers 250 250 and type-bars 6 6. Each pin, as before said, in all its different positions overlies the corresponding group-controlling lever 264. Each pin normally underlies the first radial lever 250 of the group of radial levers controlled by it, and it is oscillated to underlie the second, third, and fourth radial levers of its group, respectively, by depressing the keys 280, 281, and 282, respectively. When the connection between the thumb-key 280, 281, or 282 is depressed and the corresponding key-actuated lever 285, 286, or 287 is temporarily broken by the motor-impelled releasing-frame 30 acting upon the latch 44, corresponding to the key depressed to free said latch, the pin-carrier 255 and the parts connected therewith are returned by the contractile spring 261 to their normal positions, with the stop 258, carried by the pin-carrier 255, resting against the stop 259 of the support 260.

The pin-carrier 255 is mounted upon an axle 262, set in the cap-ring 253, on which axle it is held by the collar 263 and a set-screw.

When one of the finger-keys is depressed simultaneously with one of the thumb-keys, it is important that the thumb-key which oscillates the pin-carrier 255 should throw said pin-carrier into the required position before the circuit of the motor-magnet 10 is closed; for if the circuit of said magnet be closed before the pin-carrier has assumed the proper position a wrong letter is liable to be printed or other difficulties to result. To prevent, then, the premature closing of the circuit, means are provided which act in such manner that the circuit cannot be closed while a thumb-key is being depressed or at least cannot be closed until the thumb-key which is being depressed approaches the limit of its depression. These means consist of (a) a contact-screw 310, carried by the arm 307 of the pin-carrier-driving rock-shaft 300, Figs. 2 and 16, and normally making contact with the contact-spring 311 (which is adjustable by the screw 312) when the pin-carrier occupies its normal position, but breaking contact with said spring 311 so soon as said pin-carrier moves from its normal position, and (b) a thumb-key-operated circuit-controlling frame having a sleeve 313 journaled on the shaft of the circuit-closing frame 20, with forward-extending arms 314 and a front part 315 overlying the thumb-key-operated levers 285, 286, and 287, so as to be operated by said levers, and having slots 316 316, Figs. 5 and 6, cut into it overlying those of the levers 288 288, which but for such slots would operate said frame. Said frame has also a depending arm 317, carrying a contact-screw 318, insulated from said arm, adjustable by a lock-nut and having a platinum point which when any of the keys 280 281 282 is depressed makes contact as such key approaches the limit of its depression with another platinum point in the contact-spring 319. The effect of this arrangement, it will be observed, is such that the circuit-closing frame 20 cannot complete the circuit while the pin-carrier is taking position, but completes the circuit if the pin-carrier is being positioned only after it has reached the proper position. Thus the difficulties which I have found would otherwise sometimes arise from closing the circuit before the pin-carrier had fully reached its position are entirely avoided.

Let us now follow the path of the current with reference to the diagrammatic view Fig. 16. 236 is the battery or other source of electricity from which we may suppose the current flows to the pivot 221 of the switch 220 and thence, if said switch be closed, to the contact-point 223, thence to the pivot 71 of the rheostat-arm 70, from which it flows to the different sections of the rheostat according to the position of the handle 72 and arm 70, whether said arm makes contact with one or another of the contact-points 73, and from said rheostat the current flows, if the pin-carrier 255 be in its normal position, to the spring 311, and thence to the contact-screw 310 in the arm 307, which normally makes contact with the said spring 311, and from said screw 310 the current flows to the contact-screw 24, carried by and insulated from the arm 22 of the circuit-closing frame 20, and from said screw 24 (if the circuit-closing frame 20 be oscillated from its normal position by the depressing of a key) to the contact-spring 26, and from said contact-spring 26 to and through the convolutions of the coil 15 of the motor-magnet 10, and thence back to the negative pole of the battery 236; but if any of the thumb-keys be depressed the connection between the screw 310 and the contact-spring 311 is at once broken, so that the current instead of flowing by the path before described from the rheostat to the contact-screw 24 flows from said rheostat to the screw 318, carried by and insulated from the arm 317 of the thumb-key-operated circuit-controlling frame, and thence to the spring 319, with which the screw 318 makes connection as the thumb-key which is being depressed reaches the limit of its movement, and from said spring 319 to the contact-screw 24, carried by the circuit-closing frame 20, and thence to the contact-spring 26 and back through the coil 15 to the negative pole of the battery or other generator 236.

By means of the switch 220 it will be observed the machine can be connected with or disconnected from the battery 236 or other source of current.

By means of the rheostat illustrated in Fig. 16 the resistance of the circuit can be varied not only to compensate for changes in voltage or in resistance, but also to vary the weight of the printing blow, and by this means I am able in an instant to change the printing from light printing to very heavy printing, a matter which is often of great importance.

320 is the shift-key, which is attached to the arms 321 321 of the shaft 322. A tie-rod 323 connects the arms 321 321 and has attached to it a lug 324, which is connected at 325 with one end of the link 326, whose other end is connected with the short arm of the shifting-lever 120, so that said key when depressed shifts the platen 80 from its lower-case to its upper-case position. A contractile spring 327 serves to hold the shift-lever 120 in its normal position and to return said shift-lever and platen to their normal positions when the shift-key 320 is released. (See Fig. 2.)

By the phrase "motor-action-preventing device" used in this specification I mean a device for preventing the motor from acting. By the phrase "electromagnetic-mechanism-action-preventing device" used in this specification I mean a device for preventing electromagnetic mechanism from acting, and by the phrase "magnet-action-preventing device" used in this specification I mean a device for preventing an electromagnet from acting.

What I claim as my invention, and desire to secure by Letters Patent, is—

1. In combination in a type-writing machine, (a) type-bars, striking to a common printing-center; (b) levers equal in number to said type-bars, and connected each with the type-bar to which it corresponds; (c) group-controlling devices, each acting to control a different group of the type-bar-corresponding levers and type-bars aforesaid; (d) movement-transmitting members, corresponding to the group-controlling devices aforesaid, and acting to communicate movement from said group-controlling devices to the type-bar-corresponding levers controlled respectively by them; (e) a shifter, whereby said movement-transmitting members are shifted as a set, each intermediate the corresponding group-controlling device and the type-bar-corresponding levers operated by said group-controlling device; (f) motor mechanism for giving movement to the group-controlling devices aforesaid; (g) keys, corresponding to said group-controlling devices; (h) motor-controlling means operated by said keys; (i) releasable connections, intermediate said keys and said motor-controlling means; (k) one or more other keys at the keyboard for positioning the shifter aforesaid; (l) a device, operated by said keys, and acting to prevent the motor mechanism from impelling a type-bar while the shifter aforesaid is being positioned; (m) releasable connections intermediate said shifter-controlling keys and said motor-action-preventing device; and (n) means, acting, when a shifter-controlling key is depressed, upon the releasable connection intermediate said key and the motor-action-preventing device aforesaid, thereby to permit said motor-action-preventing device to return to its normal position in advance of the release of the key.

2. In combination in a type-writing machine, (a) type-bars, striking to a common printing-center; (b) levers equal in number to said type-bars, and connected each with the type-bar to which it corresponds; (c) group-controlling devices, each acting to control a different group of the type-bar-corresponding levers and type-bars aforesaid; (d) movement-transmitting members, corresponding to the group-controlling devices aforesaid, and acting to communicate movement from said group-controlling devices to the type-bar-corresponding levers controlled respectively by them; (e) a shifter, whereby said movement-transmitting members are shifted as a set, each intermediate the corresponding group-controlling device and the type-bar-corresponding levers operated by said group-controlling device; (f) electromagnetic means for giving movement to the group-controlling devices aforesaid; (g) keys, corresponding to said group-controlling devices; (h) circuit-closing means operated by said keys; (i) releasable connections intermediate said keys and said circuit-controlling means; (k) one or more keys at the keyboard for positioning the shifter aforesaid; (l) circuit-controlling means operated by said shifter-controlling key or keys, and acting to prevent the electromagnetic mechanism aforesaid from impelling a type-bar while the shifter aforesaid is being positioned; (m) releasable connections intermediate said shifter-controlling keys and the circuit-controlling means last mentioned; and (n) means acting, when a shifter-controlling key is depressed, upon the releasable connection intermediate said key and the electromagnetic-action-mechanism-preventing device aforesaid, thereby to permit said preventing device to return to its normal position in advance of the release of the key.

3. In combination in a type-writing machine, (a) type-bars, striking to a common printing-center; (b) levers equal in number to said type-bars, and connected each with the type-bar to which it corresponds; (c) group-controlling devices, each acting to control a different group of the type-bar-corresponding levers and type-bars aforesaid; (d) movement-transmitting members, corresponding to the group-controlling devices aforesaid, and acting to communicate movement from said group-controlling devices to the type-bar-corresponding levers controlled respectively by them; (e) a shifter, whereby said movement-transmitting members are shifted as a set, each intermediate the corresponding group-controlling device and the type-bar-corresponding levers operated by said group-controlling device; (f) a motor device common to a plurality of the group-controlling devices aforesaid and serving to give movement to the group-controlling devices to which it is common, each group-controlling device as required; (g) keys, corresponding to said group-controlling devices; (h) means operated by said keys, whereby said group-controlling devices are connected, each as required, with the motor device before mentioned as common to said group-controlling devices; (i) releasable connections, wherethrough said keys act upon the means last mentioned, each key to connect the appropriate group-controlling device with the common motor; (k) one or more other keys at the keyboard for positioning the shifter aforesaid; (l) a device operated by said keys, and acting to prevent the motor aforesaid from impelling a type-bar while the shifter aforesaid is being positioned; (m) releasable connections intermediate said shifter-controlling keys and said motor-action-preventing device; and (n) means, acting, when a shifter-controlling key is depressed, upon the releasable connection intermediate said key and the motor-action-preventing device aforesaid, thereby to permit said motor-preventing device to return to its normal position in advance of the release of the key.

4. In combination in a type-writing machine, (a) type-bars, striking to a common printing-center; (b) levers equal in number to said type-bars, and connected each with the type-bar to which it corresponds; (c) group-controlling devices, each acting to control a different group of the type-bar-corresponding levers and type-bars aforesaid; (d) movement-transmitting members, corresponding to the group-controlling devices aforesaid, and acting to communicate movement from said group-controlling devices to the type-bar-corresponding levers controlled respectively by them; (e) a shifter, whereby said movement-transmitting members are shifted as a set, each intermediate the corresponding group-controlling device and the type-bar-corresponding levers operated by said group-controlling device; (f) an electromagnet common to a plurality of group-controlling devices aforesaid and serving to give movement to the group-controlling devices to which it is common, each group-controlling device as required; (g) keys at the keyboard corresponding to said group-controlling devices; (h) means operated by said keys, whereby said group-controlling devices are connected, each as required, with the electromagnet before mentioned; (i) releasable connections, wherethrough said keys act upon the means last mentioned, each key to connect the corresponding group-controlling device with the common electromagnet before mentioned; (k) one or more other keys at the keyboard for positioning the shifter aforesaid; (l) a circuit-controlling device operated by said keys and serving to prevent the electromagnet aforesaid from impelling a type-bar while the shifter aforesaid is being positioned; (m) releasable connections intermediate said shifter-controlling keys and the circuit-controlling means last mentioned; and (n) means acting, when a shifter-controlling key is depressed, upon the releasable connection intermediate said key and the electromagnetic-action-mechanism-preventing device aforesaid, thereby to permit said action-preventing device to return to its normal position in advance of the release of the key.

5. In a selecting device for a type-writing machine, or other similar instrument, the combination with a pin-carrier and keys for positioning said pin-carrier, and a motor device for acting upon one of the pins in said pin-carrier, of (a) a device for preventing said motor from acting while said pin-carrier is being positioned; (b) releasable connections intermediate the pin-carrier-controlling key or keys aforesaid, and said motor-action-preventing device, wherethrough said key, when depressed, operates said motor-action-preventing device; (c) means acting, when said pin-carrier-controlling key has been depressed, upon the releasable connection intermediate said key and said motor-action-preventing device, to permit said motor-action-preventing device to return to its normal position in advance of the release of the key.

6. In a selecting device for a type-writing machine, or other similar instrument, the combination with a pin-carrier and keys for positioning said pin-carrier, and an electromagnet for acting upon one of the pins in said pin-carrier, of (a) a device for preventing said magnet from acting while said pin-carrier is being positioned; (b) releasable connections intermediate the pin-carrier-controlling key or keys aforesaid and said magnet-action-preventing device, wherethrough said key when depressed, operates said magnet-action-preventing device; (c) means acting when said pin-carrier-controlling key has been depressed, upon the releasable connection intermediate said key and said magnet-action-preventing device, to permit said magnet-action-preventing device to return to its normal position in advance of the release of the key.

7. In a selecting device for a type-writing machine, or other similar instrument, the combination with a shifting device and a key at the keyboard for actuating said shifting device, of (a) a motor; (b) a motor-action-preventing device operated by said shifter-controlling key; (c) a releasable connection, wherethrough said key acts upon said motor-action-preventing device; and (d) a motor-actuated device, acting when said key is depressed, to free said releasable connection, thereby to permit said motor-action-preventing device to return to its normal position in advance of the release of the key.

8. In a selecting device for a type-writing machine, or other similar instrument, the combination with a shifting device and a key at the keyboard for actuating said shifting device, of (a) a motor; (b) a motor-action-preventing device operated by said shifter-controlling key; (c) a releasable connection, wherethrough said key acts upon said motor-action-preventing device; said motor acting when said key is depressed, to free the releasable connection aforesaid, thereby to permit the motor-action-preventing device to return to its normal position in advance of the release of the key.

9. In a type-writing machine having type-bars and keys for operating them, the combination of (a) a type-bar-selecting shifter; (b) a type-bar-operating motor; (c) a device acting, when a key is depressed, to bring said motor into action; (d) a device for preventing said motor from acting while the type-bar-selecting shifter aforesaid is being shifted; and (e) an automatic releasing device, whereby, when a key is depressed, the parts aforesaid are left free to return to their normal positions in advance of the release of the key controlling them, so that another key may be depressed to print while the key first depressed is still held down.

10. In a type-writing machine, having type-bars striking to a common printing-center and keys for controlling said type-bars, the combination with said keys and type-bars of (a)

a type-bar-selecting shifter; (b) a type-bar-operating frame; (c) an electromagnet for giving movement to said frame; (d) a circuit-controlling device acting, when a key is depressed to bring the electromagnet aforesaid into action to operate the frame aforesaid; (e) a device for preventing said electromagnet from operating the frame aforesaid while the type-bar-selecting shifter aforesaid is being shifted; and (f) automatic releasing means whereby, when one or more of the keys aforesaid are depressed to operate the device aforesaid for bringing the electromagnet aforesaid into action to operate the frame aforesaid and the device before mentioned for preventing said magnet from operating said frame, while the type-bar-selecting shifter aforesaid is being positioned, said two devices last mentioned are permitted to return to their normal positions in advance of the release of the key or keys controlling them, so that another key may be depressed to print while the key first depressed is still held down.

11. In a type-writing machine, having type-bars striking to a common printing-center and keys for controlling said type-bars, the combination with said keys and type-bars of (a) a type-bar-selecting shifter; (b) a type-bar-operating frame; (c) an electromagnet for giving movement to said frame; (d) a circuit-closing device acting, when a key is depressed, to close the circuit of the electromagnet aforesaid, so that it operates the frame aforesaid; (e) another circuit-controlling device normally closing a break in the circuit of the electromagnet aforesaid, but serving to open such break while the shifter aforesaid is being shifted; and (f) automatic releasing means whereby, when one or more keys are depressed to operate the circuit-controlling devices before mentioned, said circuit-controlling devices are permitted to return to their normal positions in advance of the release of the key or keys depressed, so that another key may be depressed to print, while the keys first depressed are still held down.

12. In combination, in a type-writing machine, (a) type-bars striking to a common printing-center; (b) type-bar-controlling levers, each connected with the type-bar to which it corresponds; (c) a pin-carrier and pins mounted in said pin-carrier to act upon the type-bar-corresponding levers aforesaid; (d) one or more keys for positioning said pin-carrier; (e) motor mechanism for acting upon the pins in said pin-carrier, each pin as required; (f) a motor-action-preventing device, for preventing said motor-action mechanism from acting on a pin in the pin-carrier aforesaid, while said carrier is being positioned; (g) releasable connections intermediate the pin-carrier-controlling key or keys aforesaid and said motor-action-preventing device, wherethrough said motor-action-preventing device is operated when such pin-carrier-controlling key is depressed; and (h) means acting, when a pin-carrier-controlling key has been depressed, upon the releasable connections intermediate said keys and the motor-preventing device aforesaid, to permit said motor-preventing device to return to its normal position in advance of the release of said key.

13. In combination, in a type-writing machine, (a) type-bars striking to a common printing-center; (b) type-bar-controlling levers, each connected with the type-bar to which it corresponds; (c) a pin-carrier and pins mounted in said pin-carrier to act upon the type-bar-corresponding levers aforesaid; (d) one or more keys for positioning said pin-carrier; (e) an electromagnet for acting upon one of the pins in said pin-carrier; (f) a circuit-controlling device for closing the circuit of said magnet to bring it into action; (g) another circuit-controlling device normally closing a break in the circuit of the electromagnet aforesaid, said last-mentioned circuit-controlling device being operated by the pin-carrier-controlling key or keys aforesaid, and acting when such key is depressed to open the circuit of the electromagnet aforesaid, while the pin-carrier is being positioned; (h) releasable connections between the circuit-controlling device last mentioned and the pin-carrier-controlling key or keys aforesaid, wherethrough said circuit-controlling device is operated when a pin-carrier-controlling key is depressed; and (i) means acting, when a pin-carrier-controlling key has been depressed, to release the circuit-controlling device or devices operated thereby, whereby said circuit-controlling device is permitted to return to its normal position in advance of the release of said key.

In testimony whereof I have hereunto set my hand, at Washington, in the District of Columbia, this 28th day of February, 1901, in the presence of the subscribing witnesses whose names are hereunto affixed.

THADDEUS CAHILL.

Witnesses:
   H. L. BISSELL,
   D. M. SMITH.